US009370893B2

(12) United States Patent
Takehana

(10) Patent No.: US 9,370,893 B2
(45) Date of Patent: Jun. 21, 2016

(54) BLOW MOLD UNIT AND BLOW MOLDING DEVICE

(71) Applicant: NISSEI ASB MACHINE CO., LTD., Nagano (JP)

(72) Inventor: Daizaburo Takehana, Nagano (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 0 days.

(21) Appl. No.: 14/437,926

(22) PCT Filed: Oct. 23, 2013

(86) PCT No.: PCT/JP2013/078664
§ 371 (c)(1),
(2) Date: Apr. 23, 2015

(87) PCT Pub. No.: WO2014/065306
PCT Pub. Date: May 1, 2014

(65) Prior Publication Data
US 2015/0290866 A1    Oct. 15, 2015

(30) Foreign Application Priority Data

Oct. 23, 2012 (JP) .................................. 2012-234143

(51) Int. Cl.
| B29C 49/36 | (2006.01) |
| B29C 49/56 | (2006.01) |
| B29C 49/06 | (2006.01) |
| B29C 49/48 | (2006.01) |

(52) U.S. Cl.
CPC ............. B29C 49/36 (2013.01); B29C 49/56 (2013.01); *B29C 49/06* (2013.01); *B29C 2049/4892* (2013.01); *B29C 2049/563* (2013.01)

(58) Field of Classification Search
CPC .................................. B29C 49/36; B29C 49/56
See application file for complete search history.

(56) References Cited

U.S. PATENT DOCUMENTS

| 3,195,186 A | * | 7/1965 | Gauban | B29C 45/641 |
| | | | | 425/450.1 |
| 3,559,235 A | * | 2/1971 | Hagen | B29C 49/56 |
| | | | | 425/541 |
| 3,576,048 A | * | 4/1971 | Stanley | B29C 49/56 |
| | | | | 425/541 |
| 3,734,671 A | * | 5/1973 | Talasz | B29C 45/1761 |
| | | | | 425/541 |
| 3,787,165 A | * | 1/1974 | Fischer | B29C 45/1761 |
| | | | | 425/450.1 |
| 3,989,437 A | * | 11/1976 | Kiefer | B29C 49/56 |
| | | | | 425/541 |

FOREIGN PATENT DOCUMENTS

| JP | 06-262671 | 9/1994 |
| JP | 06-278198 | 10/1994 |
| JP | 06-344428 | 12/1994 |

(Continued)

OTHER PUBLICATIONS

International Search Report, Application No. PCT/JP2013/078664, dated Feb. 4, 2014.

*Primary Examiner* — Robert B Davis
(74) *Attorney, Agent, or Firm* — David L. Hoffman; Hoffman Patent Group

(57) ABSTRACT

In the process of closing a blow cavity split mold 14, a roller 32 is allowed to directly contact a bottom surface 38 of a guide block 36 and roll thereon. Thus, the mold clamping movement of the blow cavity split mold 14 is guided, without clearance from the guide block 36. Consequently, the upward movement of the blow cavity split mold 14 is regulated.

4 Claims, 7 Drawing Sheets

(56) References Cited

FOREIGN PATENT DOCUMENTS

| JP | 2001-310376 | 11/2001 |
| JP | 2004-255598 | 9/2004 |
| JP | 2006-315266 | 11/2006 |

* cited by examiner

BLOW MOLD UNIT AND BLOW MOLDING DEVICE

This application is a U.S. national stage application of International Patent Application No. PCT/JP2013/078664, having an international filing date of Oct. 23, 2013, which designated the United States and which claims priority from Japanese Patent Application No. 2012-234143, filed on Oct. 23, 2012, the entirety of both of which are incorporated herein by reference.

TECHNICAL FIELD

This invention relates to a blow mold unit and a blow molding device for blow molding a preform.

BACKGROUND ART

As a method for molding a thin-walled packaging container formed from a synthetic resin, a technology is known, for example, which comprises positioning within a blow mold a preform obtained by injection molding or extrusion, and expanding the preform in a longitudinal direction and a lateral direction, to obtain a final container by biaxial stretch blow molding (see, for example, Patent Documents 1 to 3).

In the process of biaxial stretch blow molding, the preform is stretched using high pressure blowing air, and the stretched preform is pressed against the cavity face of the blow mold composed of a pair of split molds. By this procedure, the final container of a shape corresponding to the shape of the cavity face of the blow mold is obtained. Thus, the blow mold comprising the pair of split molds needs to maintain a reliable mold clamping state.

With a conventionally known biaxial stretch blow molding device, when each split mold is clamped, a force opposing the blowing pressure is exerted on the end face (parting face) on the cavity face side. That is, the pair of split molds is clamped by mold clamping mechanisms such as hydraulic actuators or toggles to exert a high clamping pressure on the parting faces.

In the case of the blow mold having the pair of split molds, the mold clamping state can be maintained reliably by exerting a high clamping pressure on the parting faces as mentioned above. Moreover, the opening and closing movements of the split mold are managed with high accuracy, whereby the mold clamping state of the pair of split molds can be maintained reliably, and the clamping pressure on the parting faces can be kept high. Patent Document 2 discloses a blow molding device having a guide member provided laterally of a blow mold so that the upward movement of the split mold can be regulated, with the motion of the split mold in the opening/closing direction being permitted, by the guide member. Patent Document 3 discloses a molding apparatus having a mold opening prevention mechanism provided laterally of a blow mold.

PRIOR ART DOCUMENTS

Patent Documents

Patent Document 1: JP-A-2006-315266
Patent Document 2: JP-A-Hei-6-344428
Patent Document 3: JP-A-Hei-6-262671

SUMMARY OF THE INVENTION

Problems to be Solved by the Invention

The blow molding device described in Patent Document 2 has a guide groove provided on the side surface of the blow mold, and a guide protrusion provided on the guide member on the machine base side, so that the guide groove and the guide protrusion are brought into engagement during the mold opening/closing action of the blow mold. Because of this configuration, the motions of the blow mold during mold opening/closing and mold clamping are regulated, and the rise of the blow mold is prevented.

The device described in Patent Document 2, however, needs to have a clearance of the order of at least 0.05 mm provided between the guide groove and the guide protrusion, because the guide protrusion is configured to move in the guide groove. For this reason, during mold opening/closing and mold clamping, the blow mold moves upward over a distance corresponding to the clearance, with the result that mold opening still occurs in an upper part of the blow mold. Moreover, the guide member has abrasion resistance enhanced by nitriding or the like, but the occurrence of a metallic powder due to the contact of the guide protrusion with the inner surface of the guide groove has not been avoided. This occurrence of metallic powder may pose sanitary problems.

With the molding device of Patent Document 3, a locking member movable forward and backward by an air cylinder or the like is fixed to a side surface of the blow mold, and a protrusion of the locking member is engaged with a concavity in the side surface of the blow mold during blow molding, whereby mold opening is prevented. The adoption of this method may certainly be able to prevent mold opening. The use of this method, however, involves the problems that restrictions are imposed on the shape of the blow mold, and eventually on the shape of the resulting molded product, and costs are increased.

The present invention has been accomplished in the light of the above circumstances. It is an object of the invention to provide a blow mold unit and a blow molding device which enable a simple mechanism to perform opening and closing movements of a pair of split molds with high accuracy, thereby maintaining the mold clamping state of the split molds reliably.

Means for Solving the Problems

A first aspect of the present invention, aimed at solving the above problems, is a blow mold unit comprising: a blow mold including a pair of split molds openably and closably supported on a machine base; guided members provided in the split molds at sites along an opening/closing direction; and guide members which are provided on the machine base and which the guided members contact so as to roll relatively in accordance with opening and closing of the pair of split molds.

According to the first aspect mentioned above, the guided members are guided by the guide member in a rolling manner. Thus, the opening and closing movements of the pair of split molds can be guided in the absence of clearance. Hence, the opening and closing movements are guided, with movements other than those in the opening/closing direction of the pair of split molds being regulated, and the occurrence of foreign matter due to the sliding contact of the metals can be eliminated to improve the position accuracy of the pair of split molds.

Because of the relatively simple mechanism, moreover, the opening and closing movements of the pair of split molds can be performed with high accuracy, and the mold clamping state of the split molds can be maintained reliably.

A second aspect of the present invention is the blow mold unit according to the first aspect, wherein the guided members are each a rotating member rotating about an axis perpendicular to the opening/closing direction of the split mold, and the guide members each have a rolling contact surface for regulating the movement of the split mold in a direction crossing the opening/closing direction of the split mold upon rolling of the rotating member.

According to the second aspect mentioned above, the roller rotates in direct contact with the rolling contact surface of the guide member, and the opening and closing movements of the pair of split molds are guided, with movements in direction other than the opening/closing direction being regulated.

A third aspect of the present invention is the blow mold unit according to the second aspect, wherein the rotation center axis of the rotating member extends along a direction perpendicular to the opening/closing direction of the split mold, the guide member is a guide block having a bottom surface parallel to a surface including the opening/closing direction of the split mold and the direction of extension of the rotation center of the rotating member, and the rolling contact surface is the bottom surface of the guide block.

According to the third aspect mentioned above, during the opening and closing movements, vertical movements (upward movement) of the pair of split molds are regulated, and the mold clamping state is maintained reliably. Thus, the upper mold opening of the pair of split molds is inhibited reliably, regardless of the shape of the preform.

A fourth aspect of the present invention is a blow molding device, comprising the blow mold unit according to any one of the first to third aspects.

According to the fourth aspect mentioned above, a blow molding device can be realized which is improved in the position accuracy of the pair of split molds by eliminating the occurrence of foreign matter due to the sliding contact of the metals.

Effects of the Invention

According to the present invention of the above-described configuration, the relatively simple mechanism makes it possible to perform the opening and closing movements of the pair of split molds, and maintain the mold clamping state of the split molds reliably.

MODE FOR CARRYING OUT THE INVENTION

Figure 1:
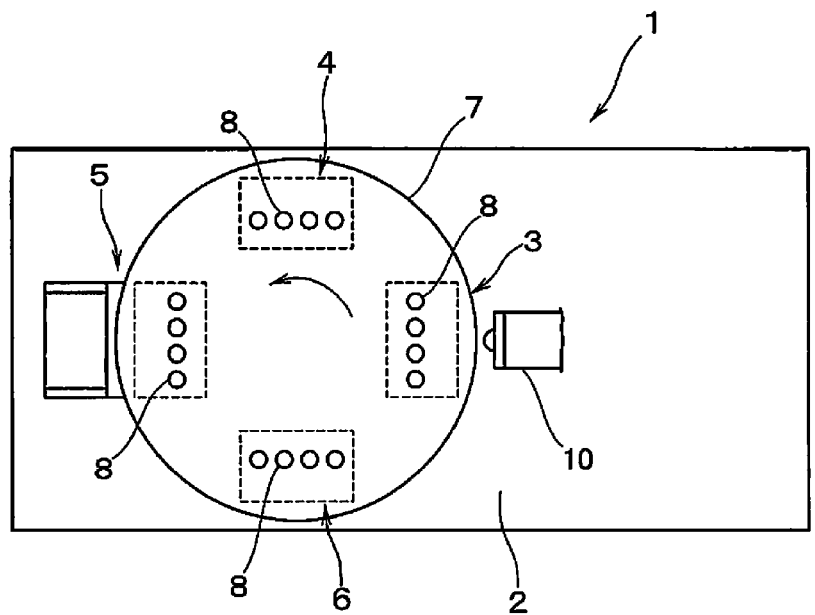
FIG. 1 is a plan view illustrating an example of a molding apparatus according to an embodiment of the present invention.

First of all, the entire configuration of a molding apparatus will be described based on FIG. 1. As shown in FIG. 1, a molding apparatus includes an injection molding device 3, a temperature control device 4, a blow molding device 5, and an ejection device 6 arranged on a machine base 2. Above the injection molding device 3, temperature control device 4, blow molding device 5, and ejection device 6, a rotary board 7 is provided. The rotary board 7 is, for example, intermittently rotatable counterclockwise with respect to the machine base 2.

A nozzle 10 of an injection unit is coupled to the injection molding device 3, and a preform is formed in the injection molding device 3. In the temperature control device 4, the temperature of the preform is adjusted to a desired temperature. In the blow molding device 5, the temperature-controlled preform is biaxially stretch blow molded to produce a molded product. The molded product is ejected to the outside by the ejection device 6.

Lip molds 8 are provided at four locations in the peripheral direction of the rotary board 7. The preforms and the molded products are held by the lip molds 8, and transported sequentially to predetermined devices by the intermittent rotations of the rotary board 7.

Next, the blow molding device equipped with a blow mold unit will be described based on FIGS. 2 to 6.

Figure 2:
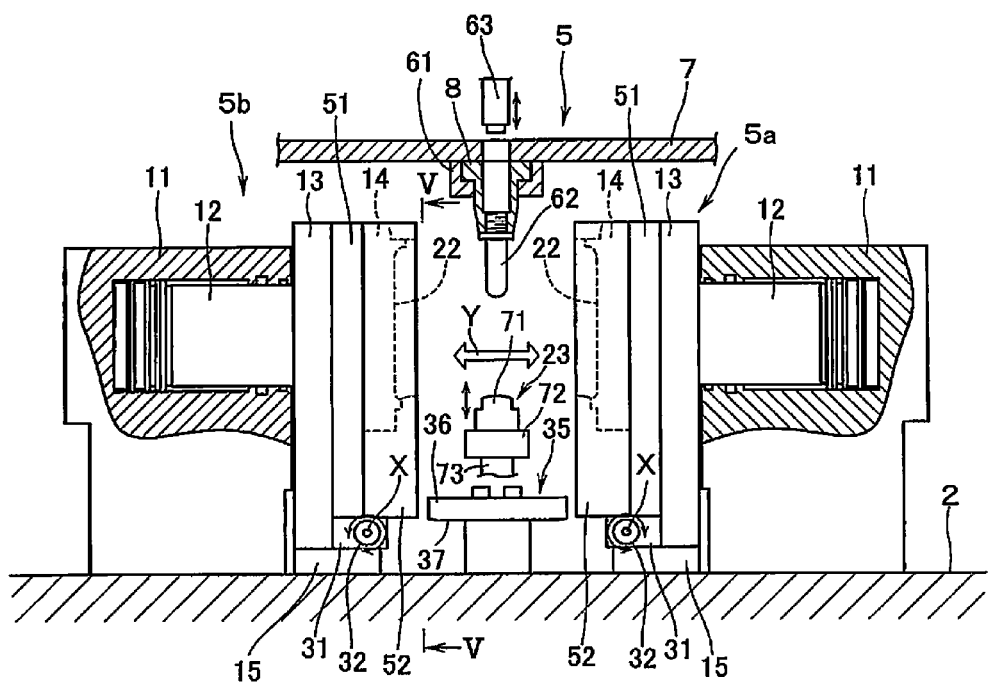
FIG. 2 is a side view of a blow molding device equipped with a blow mold unit according to the embodiment of the present invention.
Figure 3:
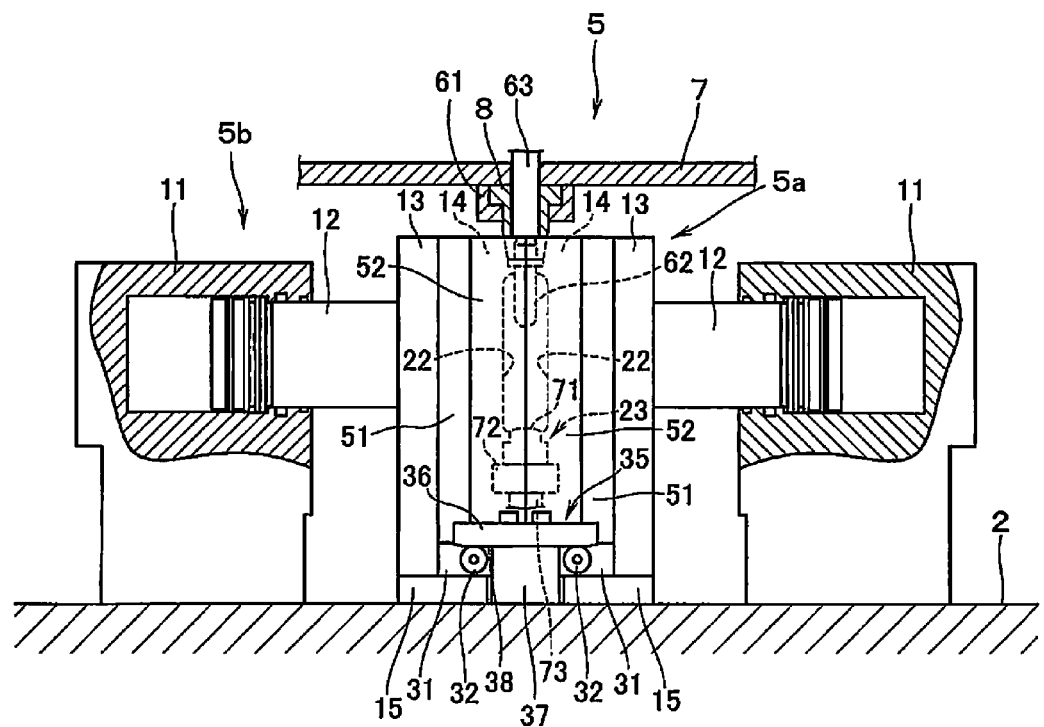
FIG. 3 is a side view of the blow molding device equipped with the blow mold unit according to the embodiment of the present invention.
Figure 4:
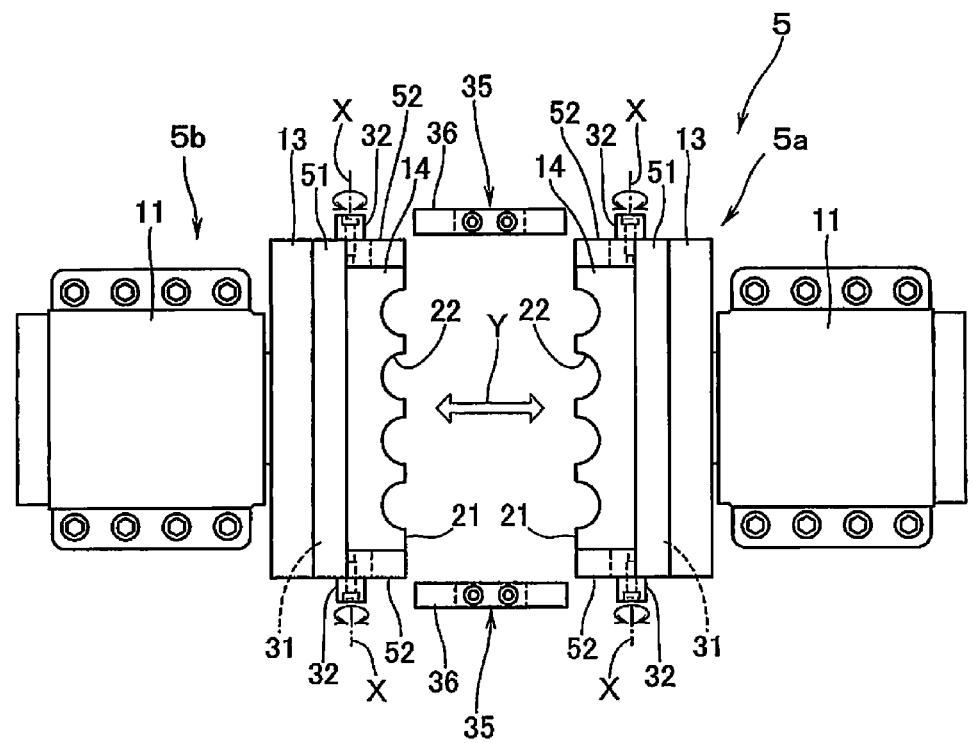
FIG. 4 is a plan view of the blow molding device equipped with the blow mold unit according to the embodiment of the present invention.
Figure 5:
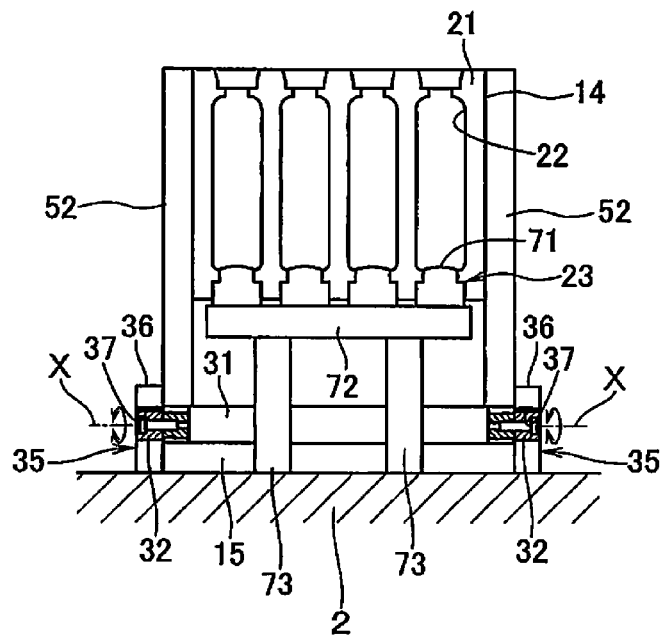
FIG. 5 is a view taken on the arrowed line V-V of FIG. 2.
Figure 6:
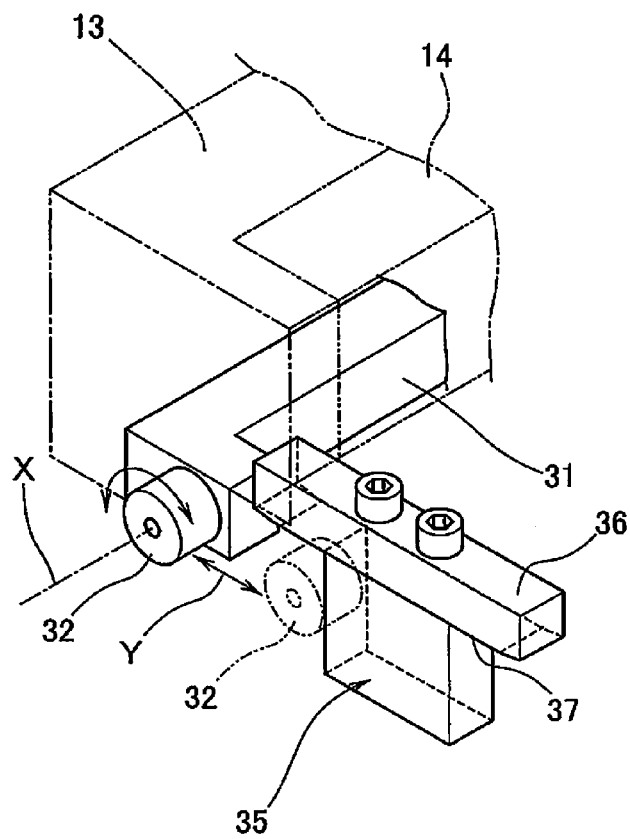
FIG. 6 is an appearance diagram illustrating the relationship between a guide roll and a guide block.

FIG. 2 is a side view of the blow molding device, the view showing a state in which split molds of the blow mold unit are open. FIG. 3 is a side view of the blow molding device, the view showing a state in which the split molds of the blow mold unit are closed. FIG. 4 is a plan view of the blow molding device, the view showing a state in which the split molds of the blow mold unit are open. FIG. 5 is a view taken on the arrowed line V-V in FIG. 2. FIG. 6 is an appearance diagram illustrating the relationship between a guide roll and a guide block.

As shown in FIGS. 2 to 4, the blow molding device 5 is provided on the machine base 2. The blow molding device 5 is composed of a blow mold unit 5a having a pair of blow molds, and a blow mold mechanism section 5b for driving the blow mold unit 5a. Concretely, on the machine base 2, hydraulic actuators as a pair, which constitute the blow mold mechanism section 5b, are installed opposite to each other with a predetermined spacing. A mold clamping plate 13 is fixed to the leading end (opposing portion) of a drive rod 12 of each hydraulic actuator 11. The blow mold unit 5a is fixed to opposing surfaces of the mold clamping plates 13 (the surfaces on the opposite side from the surfaces where the drive rods 12 are fixed). Concretely, blow cavity split molds 14 are fixed to the opposing surfaces of the mold clamping plates 13 via fixing plates 51. Each blow cavity split mold 14 is sandwiched between and held by pressure receiving plates 52. A slide metal 15 is fixed throughout the lower surfaces of each mold clamping plate 13 and each blow cavity split mold 14 (pressure receiving plates 52). The slide metal 15 is formed, for example, from an oil-impregnated metal, and the slide metals 15 are used to reduce frictional resistance when the mold clamping plates 13 and the blow mold unit 5a are opened or closed on the machine base 2. In the above-mentioned configuration, the blow cavity split molds 14, the pressure receiving plates 52, and the fixing plates 51 constitute the blow mold unit 5a.

On the side of a parting face 21 of the blow cavity split mold 14, there is at least one cavity face 22 conformed to the exterior shape of the final molded product. On both sides of the blow cavity split mold 14, the pressure receiving plates 52 are provided. The blow cavity split mold 14 and the pressure receiving plates 52 are fixed to the fixing plate 51 by fixing members such as bolts. Moreover, the resulting blow mold is coupled to the mold clamping plate 13 on the machine side by means of fixing members such as bolts. The parting faces of the blow cavity split molds 14 and the pressure receiving plates 52 make mutual contact, and receive a mold clamping force.

A bottom mold mechanism 23 is provided in a lower part of the blow cavity split mold 14 (see FIG. 5). To the rotary board 7 disposed above the blow cavity split molds 14, on the other hand, a lip plate 61 is slidably fixed via a lip plate support plate (guide rail) coupled to the rotary board 7. The lip plate 61 supports the lip mold 8 (neck mold) openably and closably. A preform 62 is held by the lip mold 8. As shown in FIG. 3, the paired blow cavity split molds 14 are mold-clamped across the lip mold 8 to bring the parting faces 21 into contact, and the bottom mold mechanism 23 is raised. As a result, a blow cavity as a space for blow-molding the preform 62 is formed by the lip mold 8, the cavity faces 22 and the bottom mold mechanism 23. The preform 62 is disposed within the blow cavity. In this state, air is supplied to the preform 62 through a blow nozzle 63 inserted into the lip mold 8 to carry out blow molding.

The concrete configuration of the bottom mold mechanism 23 is as follows: Bottom molds 71 for defining the bottom shape of the molded product are provided below each of the blow cavity split molds 14. Each bottom mold 71 is fixed to a first surface of a bottom mold fixing plate 72, and elevating devices (elevating rods) 73 on the machine side are coupled to the second surface side of the bottom mold fixing plate 72 opposite to the first surface. The bottom mold fixing plate 72 and the elevating devices 73 are not necessarily required to be coupled together. For example, rods may be suspended from the second surface of the bottom mold fixing plate 72, and these rods may be pushed by a machine side elevating device.

In the present embodiment, a mold block 31 (spacer member) is provided directly below the fixing plate 51. The mold block 31 constitutes a part of the blow mold unit 5a. By so providing the mold block 31 which is a separate component from the blow cavity split mold 14, the height of the blow cavity split mold 14 can be easily changed, and the adjustment of the mold clamping position in the vertical direction can be made relatively easily. Concretely, the height adjustment of the blow cavity split mold 14 can be made with relative ease by inserting a shim plate between the mold block 31 and the fixing plate 51, or by polishing only the mold block 31 to thin it.

As shown in FIGS. 2 to 4, the slide metal 15 is supported on the upper surface of the machine base 2 so as to be capable of reciprocating. The slide metal 15 moves the respective blow molds, which constitute the blow mold unit 5a having the mold clamping plates 13 and the blow cavity split molds 14 integrated, close to or away from each other (opens or closes them) upon driving of the hydraulic actuators 11 to extend or contract the drive rods 12. By this action, the blow cavity split molds 14 are mold-clamped or mold-opened via the mold clamping plate 13 when viewed in a horizontal plane (in the directions of arrow Y).

The slide metal 15, in the present embodiment, extends integrally from the lower end face of the mold clamping plate 13 to a region below the blow mold unit 5a, but may be provided as separate components divided into those below the mold clamping plate 13 and the blow mold unit 5a.

The lip mold 8 provided above the blow cavity split mold 14 is in a tapered form. At the time of mold clamping, therefore, a force in the mold opening direction is liable to occur in the vicinity of the lip mold 8, that is, in the upper part of the blow cavity split mold 14. Moreover, the preform 62 having high pressure blowing air introduced therein presses the cavity faces 22. During molding of a container with a large mouth diameter and a small overall height (hereinafter referred to as a wide-mouthed container), the position of molding is biased extremely upward in the blow cavity. That is, only the upper part of the blow cavity split mold 14 is pressed by the preform 62, whereby the force in the mold opening direction is apt to occur. In accordance with the occurrence of such a force in the mold opening direction in the upper part of the blow cavity split mold 14, the blow cavity split mold 14 is likely to rise along the parting line.

Such a movement (rise) of the blow cavity split mold 14 can be prevented, for example, by providing tie bars as shown in JP-A-Hei-5-38750. However, this would lead to a machine cost increase and, depending on the location of installation of the tie bars, there may be restrictions on the transport of the molded product.

Furthermore, there may be a case where the bottom of the molded product is to be markedly indented inward, that is, a container with a so-called punt (an indentation like that of the bottom of a champagne bottle) is to be formed. In this case, the bottom mold 71 ascends at a high speed toward the blow cavity split mold 14 after closing of the blow cavity split mold 14, and contacts the stepped portion of the blow cavity split mold 14 for mold clamping. The impact of contact with the blow cavity split mold 14 is great, and pressure from below continues to be exerted on the blow cavity split mold 14 throughout the blow molding process. Depending on the shape of the bottom of the molded product, therefore, the blow cavity split mold 14 further tends to rise along the parting face.

In response, the present invention provides the blow mold unit 5a with a mechanism for regulating the rise of the blow cavity split mold 14, thereby suppressing the occurrence of mold opening in the upper part of the blow cavity split mold 14, as will be described below.

As shown in FIGS. 2 to 6, the mold block 31 is fixed between the lower surface side of the mold clamping plate 13 and fixing plate 51 and the slide metal 15, as mentioned above. Rollers 32 as guided members (rotating members) are rotatably supported by the side surfaces of the mold block 31 (i.e., upper and lower surfaces in FIG. 4; right and left surfaces in FIG. 5). Each roller 32 is provided at a position where it protrudes outwardly of the side surface of the pressure receiving plate 52. The rotation center axis (X-axis) of the roller 32 extends in a direction perpendicular, in a horizontal plane, to the opening/closing direction of the blow cavity split mold 14 (the direction of the arrows Y in the horizontal plane). That is, the roller 32 being the rotating member rotates about the X-axis. The roller 32 can be formed from various materials, such as a metal, a resin and hard rubber, in consideration of durability, lubricity, use environment, etc. The mold block 31 supporting the roller 32, in the present embodiment, is nearly U-shaped in a plan view, but the mold block 31 is not limited to this shape.

To the machine base 2 on the sides of the blow cavity split molds 14 at the sites where the parting faces 21 contact, guide members 35 are fixed by fixing members such as bolts. Each guide member 35 includes a guide block 36 extending along the opening/closing direction of the blow cavity split mold 14, and a strut member 37 connecting the guide block 36 and the machine base 2. The guide block 36 has a central part supported by the strut member 37, and has a bottom surface 38, as a rolling surface and a holding surface, provided on both sides of the strut member 37. The bottom surface 38 of the guide block 36 includes a plane parallel to a plane including the opening/closing direction of the blow cavity split mold 14 and the extension direction of the rotation center of the roller 32. That is, the bottom surface 38 of the guide block 36, in the present embodiment, includes a horizontal surface (holding surface).

As shown mainly in FIGS. 3 and 6, when the pair of blow cavity split molds 14 is driven in the mold clamping direction, the rollers 32 supported by the mold blocks 31 directly contact the bottom surface 38 of the guide block 36 and roll. That is, these rollers 32 roll over the surface, the bottom surface 38, of the guide block 36, so that the opening and closing movements of the blow cavity split molds 14 are guided, with their movements in directions other than the opening/closing direction being regulated. Then, the parting faces of the blow cavity split molds 14 contact each other, whereupon the rollers 32 stop at the holding surface of the guide block 36. As a result, the blow cavity split molds 14 are mold-clamped in the absence of a clearance to the guide block 36. Thus, the rise of the blow cavity split mold 14 is regulated more reliably as compared with the conventional technologies requiring clearance indispensably. Eventually, the upper mold opening of the blow cavity split mold 14 can be suppressed.

In the present embodiment, moreover, inclined planes are formed on the bottom surface 38 of the guide block 36 at sites where the rollers 32 start to contact the bottom surface 38 when the blow cavity split molds 14 are clamped. That is, each roller 32 starts contact with the bottom surface 38, beginning in the inclined plane. Thus, the roller 32 can be reliably rolled on the bottom surface 38 of the guide block 36, with the management of the assembly accuracies of the roller 32 and the guide block 36 being rendered relatively easy. By tilting the bottom surface 38 gradually downwards toward the mold clamping direction, moreover, the blow cavity split mold 14 can also be urged downwards positively in accordance with the mold clamping of the pair of blow cavity split molds 14.

The surface on which the roller 32 rolls is the bottom surface 38 of the guide block 36 (guide member 35). Thus, the direction of movement to be regulated for the blow cavity split mold 14, which is a direction other than the opening/closing direction, is a vertical direction. Furthermore, when the blow cavity split mold 14 is to be closed, the roller 32 is supported by the holding surface which is the flat part of the guide block 36. Thus, when the paired blow cavity split molds 14 are to be closed, the vertical movements (upward movements) of the pair of blow cavity split molds 14 are regulated more reliably.

The guide block 36 can be formed from various materials, such as a metal, a resin and hard rubber, in consideration of durability, lubricity, use environment, etc. Besides, the guide block 36 can be configured to be detachable so that a part thereof constituting the bottom surface 38 can be replaced.

Next, the actions of the above-described blow molding device 5 will be described.

The preform molded by the injection molding device 3 (see FIG. 1) and temperature-controlled is transported between the pair of blow cavity split molds 14 constituting the blow molding device 5. Then, the mold opening/closing (mold clamping) mechanisms such as the hydraulic actuators 11 are driven to clamp the pair of blow cavity split molds 14 via the mold clamping plates 13. In the process of closing the blow cavity split mold 14, the roller 32 directly contacts the bottom surface 38 of the guide block 36 and rolls thereon. Because of this motion, the blow cavity split mold 14 is restricted in upward movement, without clearance from the guide block 36, and the mold clamping movement of the pair of blow cavity split molds 14 is guided.

Since the roller 32 is allowed to roll on the bottom surface 38 of the guide block 36, there is no sliding contact between the metals during mold clamping. Thus, the occurrence of foreign matter (metallic powder) due to slide can be eliminated to improve the position accuracy of the pair of blow cavity split molds 14.

Owing to the contact of the roller 32 with the guide block 36, moreover, the upward movement of the blow cavity split mold 14 is reliably regulated, even when the pair of blow cavity split molds 14 is pressurized during blow molding. In association with this effect, the mold clamping state in the horizontal direction of the blow cavity split mold 14 is reliably maintained, and the position accuracy is maintained. Consequently, even when the preform is in a wide-mouthed, short, small shape (regardless of the shape of the preform or the resulting molded product), for example, a final molded product can be formed with high accuracy.

Furthermore, the blow molding device 5 equipped with the blow mold unit 5a according to the present embodiment, as described above, can carry out the opening and closing movements of the pair of blow cavity split molds 14 with high accuracy by means of a relatively simple mechanism, and can maintain the mold clamping state of the blow cavity split mold 14 reliably.

The embodiment of the present invention has been described as above, but the present invention is in no way limited to the foregoing embodiment.

Figure 7:
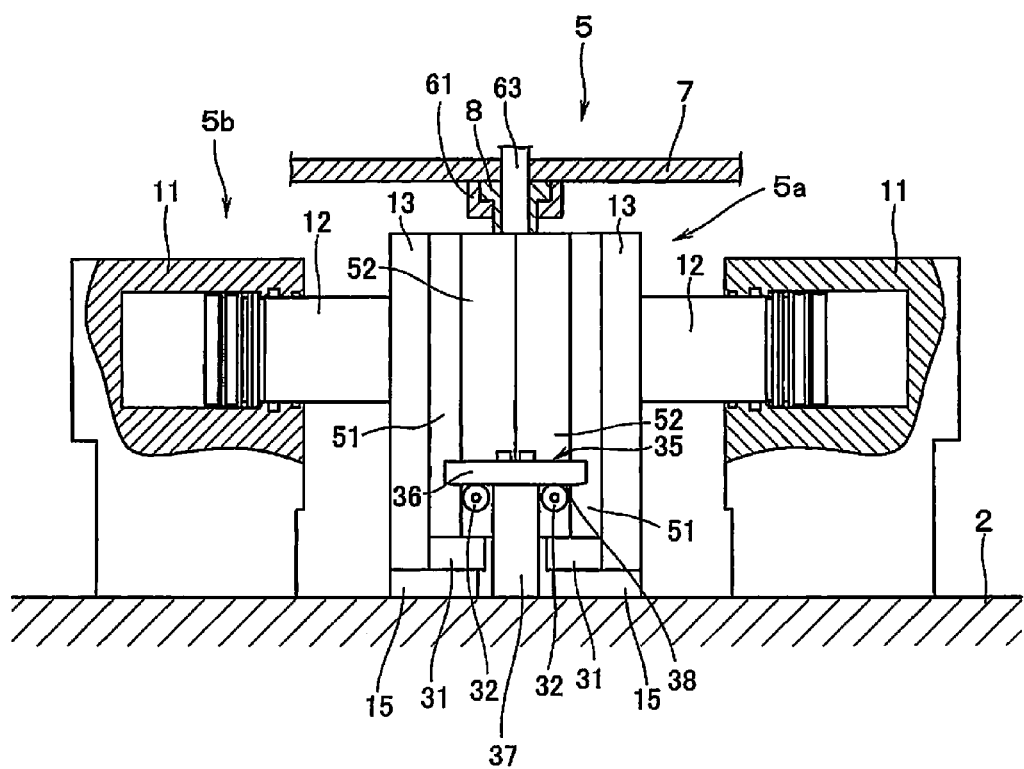
FIG. 7 is a side view showing another example of the blow molding device equipped with the blow mold unit according to the embodiment of the present invention.
Figure 8:
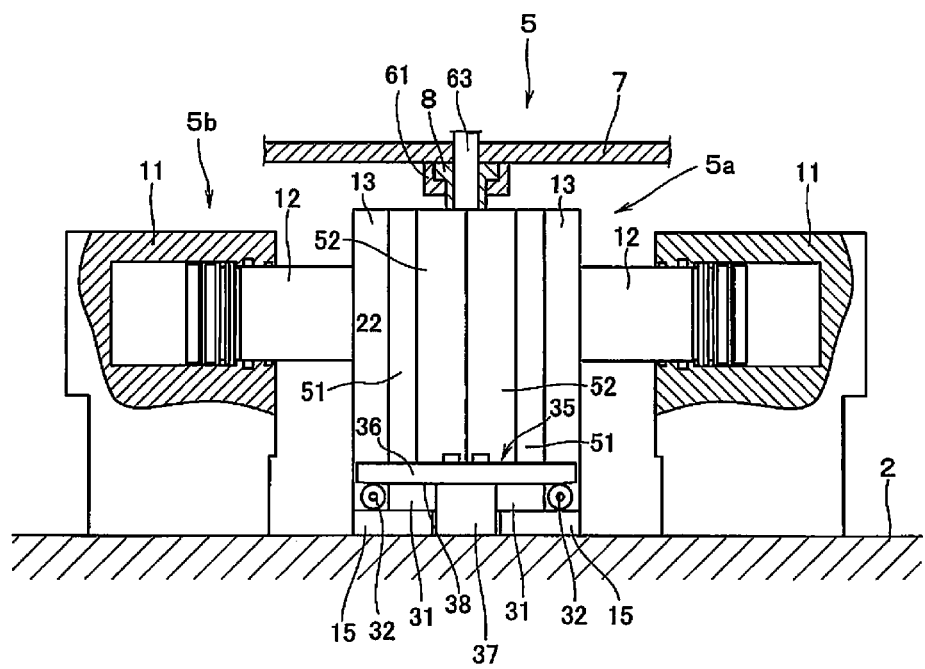
FIG. 8 is a side view showing another example of the blow molding device equipped with the blow mold unit according to the embodiment of the present invention.

For example, the location of the roller 32 can be adjusted to the optimal position for various molded products. In the above embodiment, for example, the roller 32 is disposed in the mold block 31 superior in adaptability, but the disposition of the roller 32 may be determined, as appropriate, according to the size and shape of the molded product, free space on the machine side, and so forth. Concretely, as shown in FIG. 7, the roller 32 may be provided in the pressure receiving plate 52 above the mold block 31 for the purpose of further preventing the rise of the blow cavity split mold 14. Alternatively, as shown in FIG. 8, the roller 32 may be provided in the mold clamping plate 13 on the machine side for more general use. In this case, it is necessary to extend the guide block 36 to the side of the mold clamping plate 13.

Figure 9:
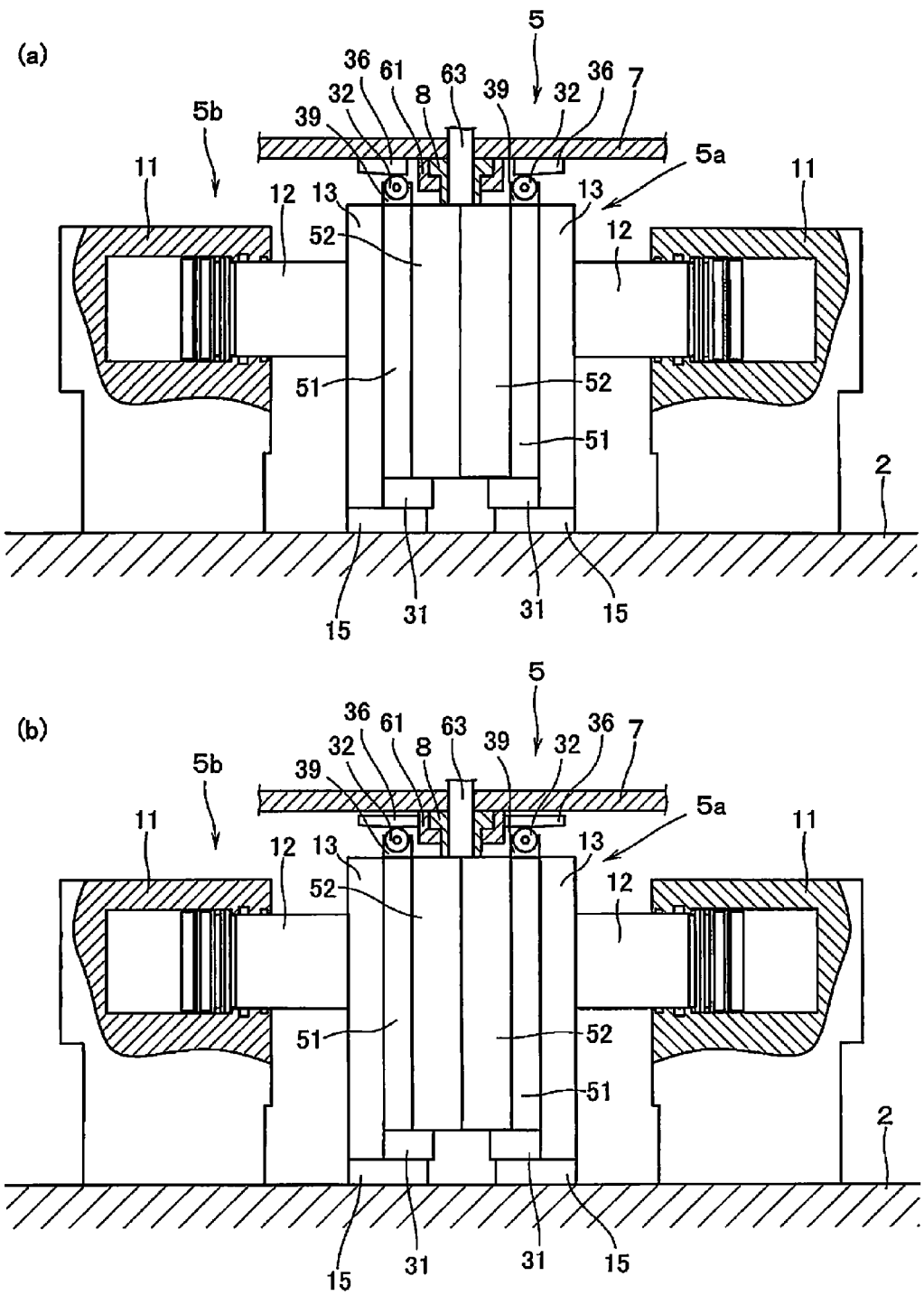
FIGS. 9(a), 9(b) are side views showing other examples of the blow molding device equipped with the blow mold unit according to the embodiment of the present invention.
Figure 10:
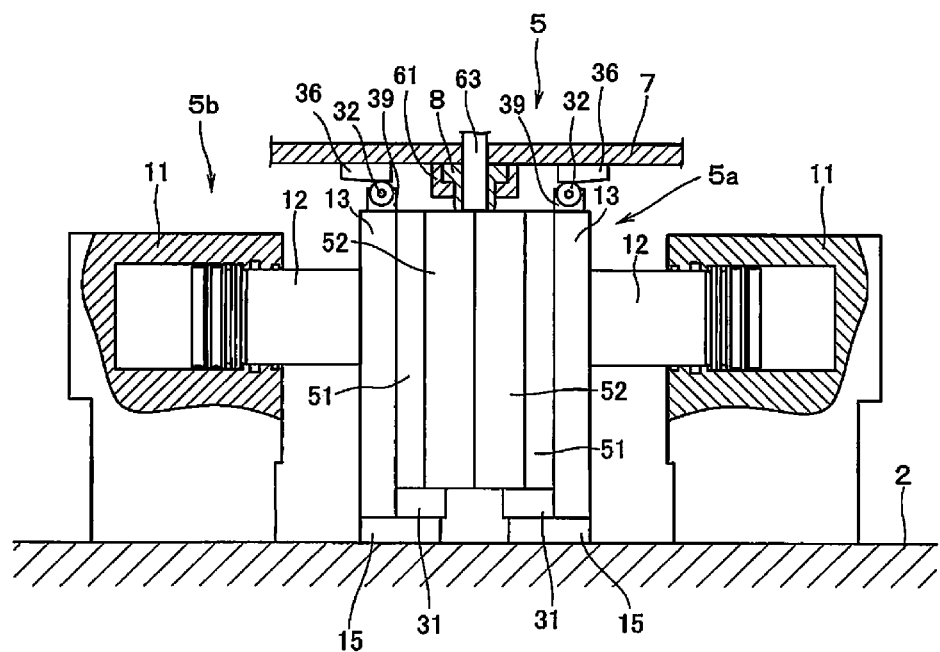
FIG. 10 is a side view showing another example of the blow molding device equipped with the blow mold unit according to the embodiment of the present invention.

Furthermore, it is also possible to dispose the roller 32 at a site corresponding to the blow space above the blow cavity split mold 14. As shown in FIGS. 9($a$), 9($b$), for example, a support member 39 may be erected on top of the pressure receiving plate 52, and the roller 32 may be provided in the support member 39. In the case of such a configuration, the guide block 36 which the roller 32 contacts may be fixed to the lower surface of the rotary board 7, as shown in FIG. 9($a$), or may be fixed to the side surface of the lip plate 61 (in the opening/closing direction of the blow mold), as shown in FIG. 9($b$). Additionally, as shown in FIG. 10, for example, the support member 39 may be erected on top of the mold clamping plate 13, and the roller 32 may be provided in the support member 39. In the case of this configuration as well, it goes without saying that the guide block 36 may be fixed to the side surface of the lip plate 61. By so providing the roller 32 above the blow cavity split mold 14, the mold opening of the blow cavity split mold 14 can be inhibited at a site adjacent to the site of pressurization.

Also, the pair of blow cavity split molds 14 may be provided with the guide members, and the rollers may be provided on the side of the machine base 2, whereby the guided members can contact the guide members so as to relatively roll as the paired blow cavity split molds 14 open or close. In this case, however, it is necessary to provide a configuration in which the roller rolls over the upper surface of the guide member.

In the above-described embodiment, the molding apparatus 1 is illustrated as having the four devices (stations), but the configuration of the molding apparatus 1 is not limited to such a configuration. The molding apparatus 1 may be one having any number of the stations, as long as it includes a blow molding device having a blow mold unit provided with split molds. For example, the molding apparatus 1 may be of a configuration in which two stations, namely, an injection molding device and a blow molding device, are provided.

EXPLANATIONS OF LETTERS OR NUMERALS

1 Molding apparatus
2 Machine base
3 Blow molding device
4 Temperature control device
5 Blow molding device
5a Blow mold unit
5b Blow mold mechanism section
6 Ejection device
7 Rotary board
8 Lip mold
11 Hydraulic actuator
12 Drive rod
13 Mold clamping plate
14 Blow cavity split mold
15 Slide metal
21 Parting face
22 Cavity face
23 Bottom mold mechanism
31 Mold block
32 Roller
35 Guide member
36 Guide block
37 Strut member
38 Bottom surface
39 Support member
51 Fixing plate
52 Pressure receiving plate
61 Lip plate
62 Preform
63 Blow nozzle
71 Bottom mold
72 Bottom mold fixing plate
73 Elevating device

The invention claimed is:

1. A blow mold unit, comprising:
a blow mold including a pair of split molds openably and closably supported in a horizontal plane on a machine base;
guided members provided in the split molds at sites along an opening/closing direction of the split molds the pair of split molds; and
guide members which are provided on the machine base and which the guided members contact so as to roll relatively in accordance with opening and closing of the pair of split molds,
wherein the guided members are each a rotating member rotating about an axis which is perpendicular to the opening/closing direction of the split molds, and which extends parallel to the horizontal plane in the opening/closing direction of the split molds,
the guide members each have a rolling contact surface for regulating movement of the split molds in a direction crossing the opening/closing direction of the split molds upon rolling of the rotating member, and
the rolling contact surface has an inclined plane, which is provided at a site where the rotating member starts to contact the guide member when the split molds are clamped and which inclines gradually downwards toward a mold clamping direction, and a holding surface which is a horizontal surface supporting the rotating member when the split molds are closed.

2. The blow mold unit according to claim 1, wherein
the guide member is a guide block having a bottom surface parallel to a surface including the opening/closing direction of the split molds and the axis of rotation of the rotating member, and
the rolling contact surface is the bottom surface of the guide block.

3. A blow molding device comprising a blow mold unit having:
a blow mold including a pair of split molds openably and closably supported in a horizontal plane on a machine base;
guided members provided in the split molds at sites along an opening/closing direction of the pair of split molds; and
guide members which are provided on the machine base and which the guided members contact so as to roll relatively in accordance with opening and closing of the pair of split molds,
wherein the guided members are each a rotating member rotating about an axis which is perpendicular to the opening/closing direction of the split molds, and which extends parallel to the horizontal plane in the opening/closing direction of the split molds,
the guide members each have a rolling contact surface for regulating movement of the split molds in a direction crossing the opening/closing direction of the split molds upon rolling of the rotating member, and
the rolling contact surface has an inclined plane, which is provided at a site where the rotating member starts to contact the guide member when the split molds are clamped and which inclines gradually downwards toward a mold clamping direction, and a holding surface which is a horizontal surface supporting the rotating member when the split molds are closed.

4. A blow molding device according to claim 3, wherein
the guide member is a guide block having a bottom surface parallel to a surface including the opening/closing direction of the split molds and the axis of rotation of the rotating member, and
the rolling contact surface is the bottom surface of the guide block.

* * * * *